(12) United States Patent
Finfrock et al.

(10) Patent No.: US 7,293,174 B1
(45) Date of Patent: Nov. 6, 2007

(54) METHOD OF ENABLING CONSUMER PRIVACY USING PERSONAL STORAGE DEVICE

(75) Inventors: Don Charles Finfrock, Gainesville, GA (US); Lynn Lester Kerchner, Duluth, GA (US)

(73) Assignee: NCR Corporation, Dayton, OH (US)

( * ) Notice: Subject to any disclaimer, the term of this patent is extended or adjusted under 35 U.S.C. 154(b) by 1022 days.

(21) Appl. No.: 09/567,097

(22) Filed: May 8, 2000

(51) Int. Cl.
*H04L 9/00* (2006.01)
(52) U.S. Cl. .............. 713/166; 713/182; 726/2
(58) Field of Classification Search .......... 713/166, 713/161, 168, 182, 171, 176; 705/1; 715/741, 715/743; 726/2
See application file for complete search history.

(56) References Cited

U.S. PATENT DOCUMENTS

| 4,582,985 | A | | 4/1986 | Lofberg |
| 4,797,543 | A | | 1/1989 | Watanabe |
| 4,882,474 | A | | 11/1989 | Anderl et al. |
| 5,731,629 | A | | 3/1998 | Woodward |
| 5,841,119 | A | | 11/1998 | Rouyrre et al. |
| 5,884,271 | A | * | 3/1999 | Pitroda ......................... 705/1 |
| 6,016,476 | A | * | 1/2000 | Maes et al. ................... 705/1 |
| 6,044,349 | A | * | 3/2000 | Tolopka et al. ............... 705/1 |

* cited by examiner

*Primary Examiner*—T. B. Truong
(74) *Attorney, Agent, or Firm*—Lowe Hauptman Gopstein Gilman & Berner, LLP; Paul W. Martin

(57) ABSTRACT

The present invention discloses a software method for creating a multilevel customer database that provides consumer data privacy via a smart card or other personal storage device. The method allows the merchant or business to access specific information that the consumer is willing to share. Each individual consumer maintains control of information that he or she considers to be personal, private, and only divulges the level or type of data that he or she feels is appropriate.

17 Claims, 4 Drawing Sheets

FIG. 5

- 500 — ☐ MEDICAL INFORMATION
  - 502 — ☒ CHRONIC CONDITIONS
  - 504 — ☑ HEALTH INSURANCE PROVIDER/PLAN NUMBER
  - 506 — ☑ ALLERGIES
  - 508 — ☑ BLOOD TYPE
  - 510 — ☑ IMMUNIZATION RECORDS
- 520 — ☒ FINANCIAL INFORMATION
  - 522 — ☒ CHECKING ACCOUNT NUMBER
  - 524 — ☒ SAVINGS ACCOUNT NUMBER
  - 526 — ☒ SALARY
- 530 — ☑ TRAVEL INFORMATION
  - 532 — ☑ AIRLINE SEAT PREFERENCE
  - 534 — ☑ SMOKING PREFERENCE
  - 536 — ☑ FREQUENT FLYER NUMBERS
  - 538 — ☑ HOTEL FREQUENT LODGING NUMBERS
  - 539 — ☑ CAR RENTAL EXPRESS RENTAL NUMBERS
- 540 — ☑ DINING INFORMATION
  - 542 — ☑ FOOD ALLERGIES
  - 544 — ☑ SMOKING PREFERENCES
- 550 — ☑ MERCHANT LOYALTY PROGRAMS
  - 552 — ☑ MERCHANT #1 (POSSIBLY A RETAILER)
  - 554 — ☑ MERCHANT #2 (POSSIBLY A GAS STATION)
  - 556 — ☑ MERCHANT #3 (POSSIBLY A RESTAURANT)
- 560 — ☐ DEMOGRAPHIC INFORMATION
  - 562 — ☑ AGE
  - 564 — ☑ SEX
  - 566 — ☑ HOUSEHOLD INCOME
  - 568 — ☑ ZIPCODE
  - 569 — ☒ CHILDREN IN THE HOUSEHOLD
- 570 — ☑ HOBBIES/INTEREST
  - 572 — ☑ TENNIS
  - 574 — ☑ BASEBALL

METHOD OF ENABLING CONSUMER PRIVACY USING PERSONAL STORAGE DEVICE

FIELD OF THE INVENTION

The present invention relates generally to e-commerce, and more particularly, to the use of a personal storage which can provide consumer information to third parties such as merchants. Even more specifically to protecting privacy rights of consumers when providing consumer information to third parties using a personal storage device such as a smart card.

BACKGROUND OF THE INVENTION

With the advent of the Internet and its use for electronic commerce, consumers worldwide have become increasingly concerned with how businesses are collecting and using data about them. Consumers are generally not opposed a business anonymously aggregating their buying preferences with other consumers to more effectively target merchandise selection and advertising. However, consumers have expressed great concern as to the collection and use of their personal information. Several countries have enacted laws to protect personal information along with its distribution.

For example, consumers can provide information about themselves to third parties by storing this information on devices such as magnetic cards, smart cards and the like and would be used for other purposes such as credit/debit or stored value smart cards, frequent shopper points (value) and the like. Thus, a need exists in the art for a method and device for storing personal consumer information in which the consumer has control over which information is provided and to whom the information is provided.

The present invention discloses a software method for creating a multilevel customer database that provides consumer data privacy via a smart card or other personal storage device. The method allows the merchant or business to access specific information that the consumer is willing to share. Each individual consumer maintains control of information that he or she considers to be personal, private, and only divulges the level or type of data that he or she feels is appropriate.

SUMMARY OF THE INVENTION

It is, therefore, an object of the present invention to provide a method and apparatus to provide control to a consumer over which information stored on a personal storage device is provided to a third party.

Another object of the present invention is to provide a method and apparatus to provide control to a consumer over which third parties are provided access to personal consumer information stored on a personal storage device.

The present invention seeks to address a solution to the issue of consumer privacy while permitting businesses to still effectively perform targeted marketing. Each consumer has data about themselves that they consider to be personal or sensitive, which they only want to share with a specific party. This information is stored on a personal storage device such as a smart card, magnetic card, Personal Digital Assistant (PDA) or the like. Examples of such data include:

Medical information—with a doctor or hospital
Salary—when applying for a loan or mortgage
Credit/debit account numbers—with a merchant for making purchasing
Insurance information—with a doctor, dentist, optician or hospital
Social security number—with various parties and differing times
Allergies—with a doctor or paramedic
Frequent flyer number—with airline, hotel or car rental agency
Bank or investment account information—when applying for a loan/mortgage
Drivers license—with a merchant for check authorization or with a policeman
Frequent buyer number—with a merchant
Personal dates, size information, demographic information and personal preferences On the other hand, consumers also have other data for which they often do not have any significant privacy concern. Furthermore, consumers often actually wish that merchants or businesses providing services to them would already know these things about them. Examples of such data include:

Seating preference on an airplane or in a theater
Hobbies or interests
Smoking or non-smoking preference in a restaurant
Food preferences
Food allergies
Model or size of car for car rental
Sports or entertainment preferences, upcoming events of interest This non-personal data provides a great deal of information to merchants desiring to perform targeted marketing. Not only does it provide the merchant with the benefit of more effectively being able to maintain and attract new customers, it provides consumers with the benefit of seeing more of what they are interested in and less advertising "noise." For example, if a merchant happens to know that a consumer is a baseball fan, but that the consumer hates opera and gives the consumer an opportunity to buy baseball tickets at a discount, most consumers would view that as a benefit rather than a disadvantage.

The present invention addresses how a consumer selects consumer information to provide to the third parties and which third parties the consumer selects to provide the consumer information. Advantageously, the consumer can protect their privacy while selecting information the consumer desires to provide to third parties, such as merchants, in exchange for value. The value could be a monetary exchange for information or the consumer may be desirous of receiving information from the third party because of personal interests or needs.

These and other objects of the present invention are achieved by a method of storing consumer information on a personal storage device, including storing at least one category of information in a consumer database on the personal storage device with each category having at least one entry for each category of information. Access rights to the information in the consumer database are either allowed to one or more information gatherers or access rights are denied to the one or more information gatherers.

The foregoing and other objects of the present invention are achieved by a method of providing consumer information from a personal storage device to one or more information gatherers where the consumer information includes at least one category of information in a consumer database on the personal storage device. Access rights are provided for each category to deny or allow access to information gatherers on a general group or individual basis. The method includes interfacing the personal storage device with an Internet interface device to interface the personal storage device with one or more information gatherers. The one or more information gatherers collects the consumer information for a category based upon the access rights stored on the personal storage device.

The foregoing and other objects of the present invention are achieved by computer architecture including storing means for storing at least one category of information in a consumer database on the personal storage device with each category having at least one entry. For each category of information, means for either allowing access rights to one or more information gatherers or denying access rights to the one or more information gatherers.

The foregoing and other objects of the present invention are achieved by an article including at least one sequence of machine executable instructions on a medium bearing the executable instructions in machine form, wherein execution of the instructions by one or more processors causes the one or more processors to store at least one category of information in a consumer database on the personal storage device with each category having at least one entry. For each category of information, either allowing access rights to one or more information gatherers or denying access rights to the one or more information gatherers.

The foregoing and other objects of the present invention are achieved by a computer system including a processor and a memory coupled to the processor, the memory having stored therein sequences of instructions, which, when executed by the processor, causes the processor to perform the steps of storing at least one category of information in a consumer database on the personal storage device with each category having at least one entry and for each category of information, either allowing access rights to one or more information gatherers or denying access rights to the one or more information gatherers.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 5 is an example of a user interface.

BEST MODE FOR CARRYING OUT THE INVENTION

A method and apparatus of enabling consumer privacy to provide selected information to third parties and to select which third parties can access the selected information are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
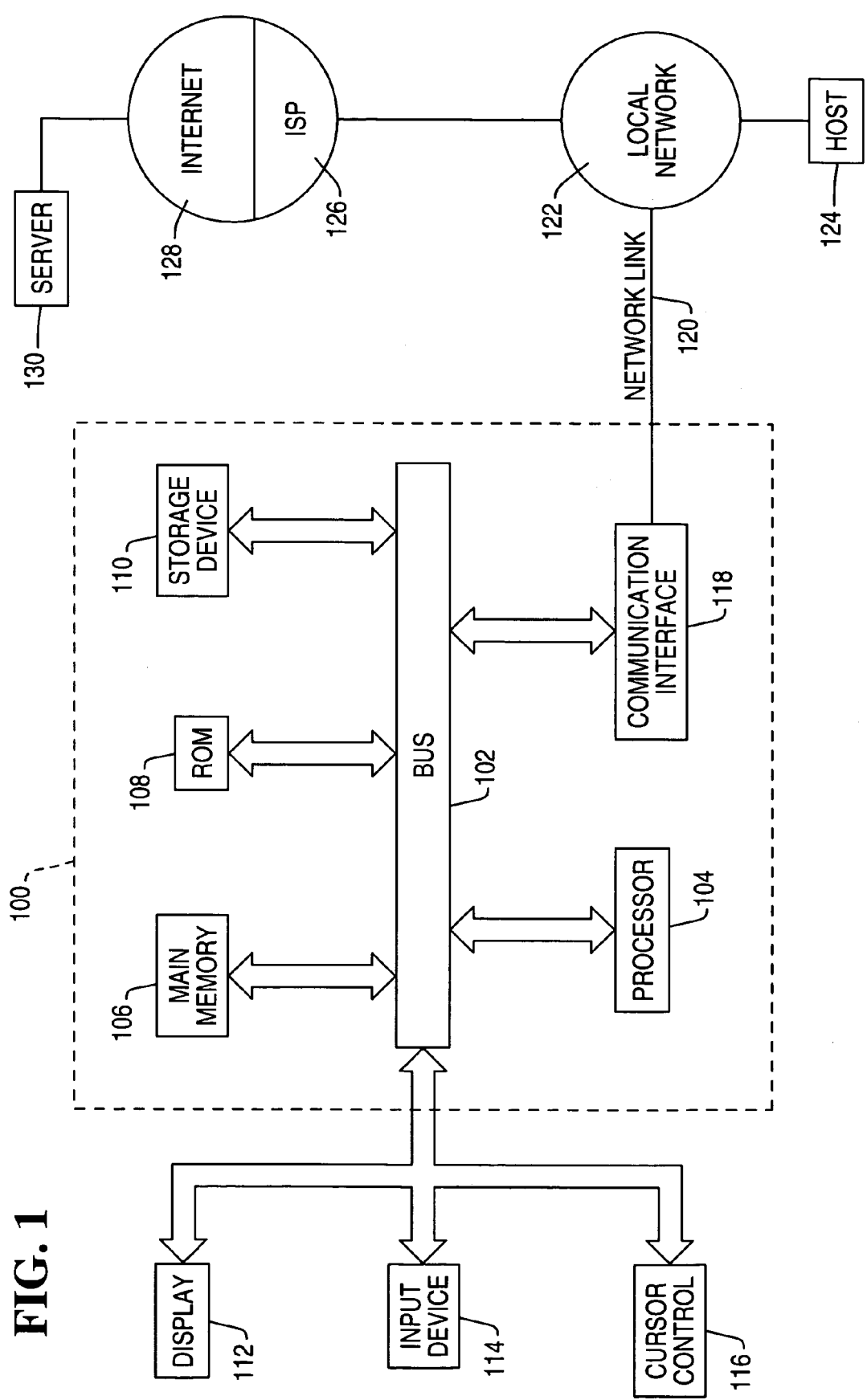
FIG. 1 is a high level block diagram illustrating exemplary computer system usable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g.,) allowing the device to specify positions in a plane.

The invention is related to the use of a computer system 100, such as the illustrated system, to provide selected information to third parties and to select which third parties can access the selected information. According to one embodiment of the invention, the selected consumer information and the selected third parties to whom the selected consumer information is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the selected consumer information and the selected third parties to whom the selected consumer information is provided. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for information discovery and visualization as described herein.

The received code may be executed by processor 104 as it is received, and/or stored in storage device 110, or other non-volatile storage for later execution. In this manner, computer system 100 may obtain application code in the form of a carrier wave.

The challenge in building a consumer or electronic commerce system is that each individual has differing opinions on what he or she considers to be personal data. From a worldwide perspective, the definition of personal data varies greatly with culture. Additionally, that consumer may be willing to provide certain data to organizations that he or she trusts, but does not want other parties to have access to this data. Furthermore, if the customer is given a purchase incentive or rebate, the customer may be willing to share data that the customer would not share otherwise.

Each consumer has data about themselves that they consider to be personal or sensitive, which they only want to share with a specific party. This information is stored on a personal storage device such as a smart card, magnetic card, two-dimensional bar coded card, Personal Digital Assistant (PDA), PDA phone, or the like. Examples of such data include:

Medical information—with a doctor or hospital
Salary—when applying for a loan or mortgage
Credit/debit account numbers—with a merchant for making purchasing
Insurance information—with a doctor, dentist, optician or hospital
Social security number—with various parties and differing times
Allergies—with a doctor or paramedic
Frequent flyer number—with airline, hotel or car rental agency
Bank or investment account information—when applying for a loan/mortgage
Drivers license—with a merchant for check authorization or with a policeman
Frequent buyer number—with a merchant
Personal dates, size information, demographic information and personal preferences On the other hand, consumers also have other data for which they often do not have any significant privacy concern. Furthermore, consumers often actually wish that merchants or businesses providing services to them would already know these things about them. Examples of such data include:

Seating preference on an airplane or in a theater
Hobbies or interests
Smoking or non-smoking preference in a restaurant
Food preferences
Food allergies
Model or size of car for car rental
Sports or entertainment preferences, upcoming events of interest This non-personal data provides a great deal of information to merchants desiring to perform targeted marketing. Not only does it provide the merchant with the benefit of more effectively being able to maintain and attract new customers, it provides consumers with the benefit of seeing more of what they are interested in and less advertising "noise." For example, if a merchant happens to know that a consumer is a baseball fan, but that the consumer hates opera and gives the consumer an opportunity to buy baseball tickets at a discount, most consumers would view that as a benefit rather than a disadvantage.

The method of the present invention uses a personal storage device (e.g., multifunction smart card) to give consumers control over their data, so that the customer can determine what is personal and what they want to share with whom. At the same time, it will give merchants and other parties the opportunity to incentive consumers to provide additional data to them, in addition to the anonymous transaction data that they may already be collecting in their data warehouse. For example, a consumer could then choose to tell merchant X the airlines they fly in exchange for a product discount. Merchant X would then know what this consumer likes to travel and in conjunction with their past buying patterns, could market additional products likely to be of interest to the consumer.

Figure 2:
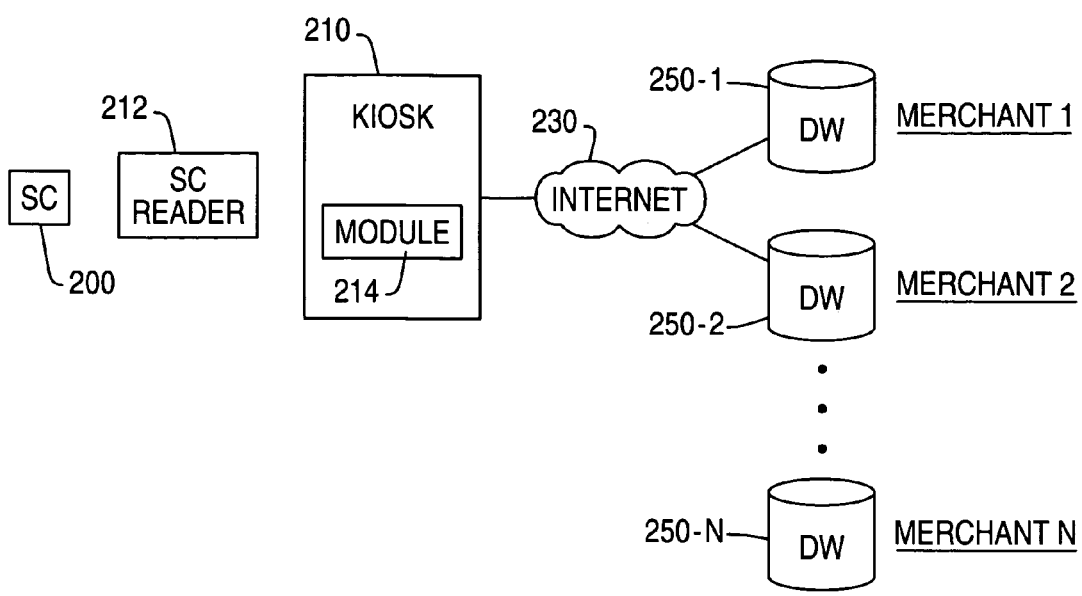
FIG. 2 is a block diagram of a physical architecture usable with the present invention including a kiosk smart card, network and third party data warehouses.
Figure 4:
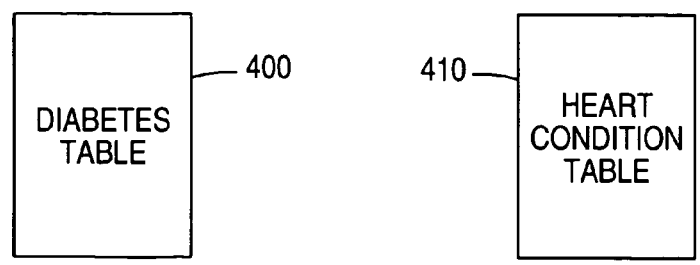
FIG. 4 is an illustration of tables having consumer information and third party information.

As depicted in FIG. 2, a personal storage device 200 is preferably a smart card or can be a magnetic card, PDA or PDA/phone). A kiosk 210 is located on a merchant's premises or home-based Internet interface device. The kiosk 210 includes a smart card reader 212 and a software module 214. The kiosk 210 is a microprocessor based device and can have the physical architecture previously described for the computer system 100. The smart card reader 212 interfaces with the smart card 200 to provide information to and from the smart card 200 to the kiosk 210. The software module 214 is used to input information to and from the smart card 200. The information includes data access rights as discussed in detail below. The personal storage device 200 contains a customer's private database (see FIGS. 3 and 4) in several levels/categories on the smart card that are secure from each other. Use of emerging and existing smart card technology could be utilized for this segment and security. Smart cards are credit card sized devices with microelectronic circuits embedded in them. The smart card may have a magnetic strip, or optically or any other known method. One of the main advantages of a smart card is a security feature. The technical features of smart cards are explained in great detail in "Smart Cards" by Artech House 1994 which is hereby incorporated by reference in its entirety. If a smart card were used as the personal storage device 200, it could interface to the smart card reader 212 located either on a kiosk or POS system or banking kiosk (ATM, in-lobby kiosk and also off premise kiosk, not in retailer's store at a merchant's or business's physical premises or on a consumer's home PC or Internet access device.) The merchant's kiosk 210 or the consumer's Internet access device cold then interface to the merchant data warehouses 250-1 . . . 250-N over the Internet 230. At least one data warehouse 250-1 . . . 250-N are components that support the method of the present invention.

Figure 3:
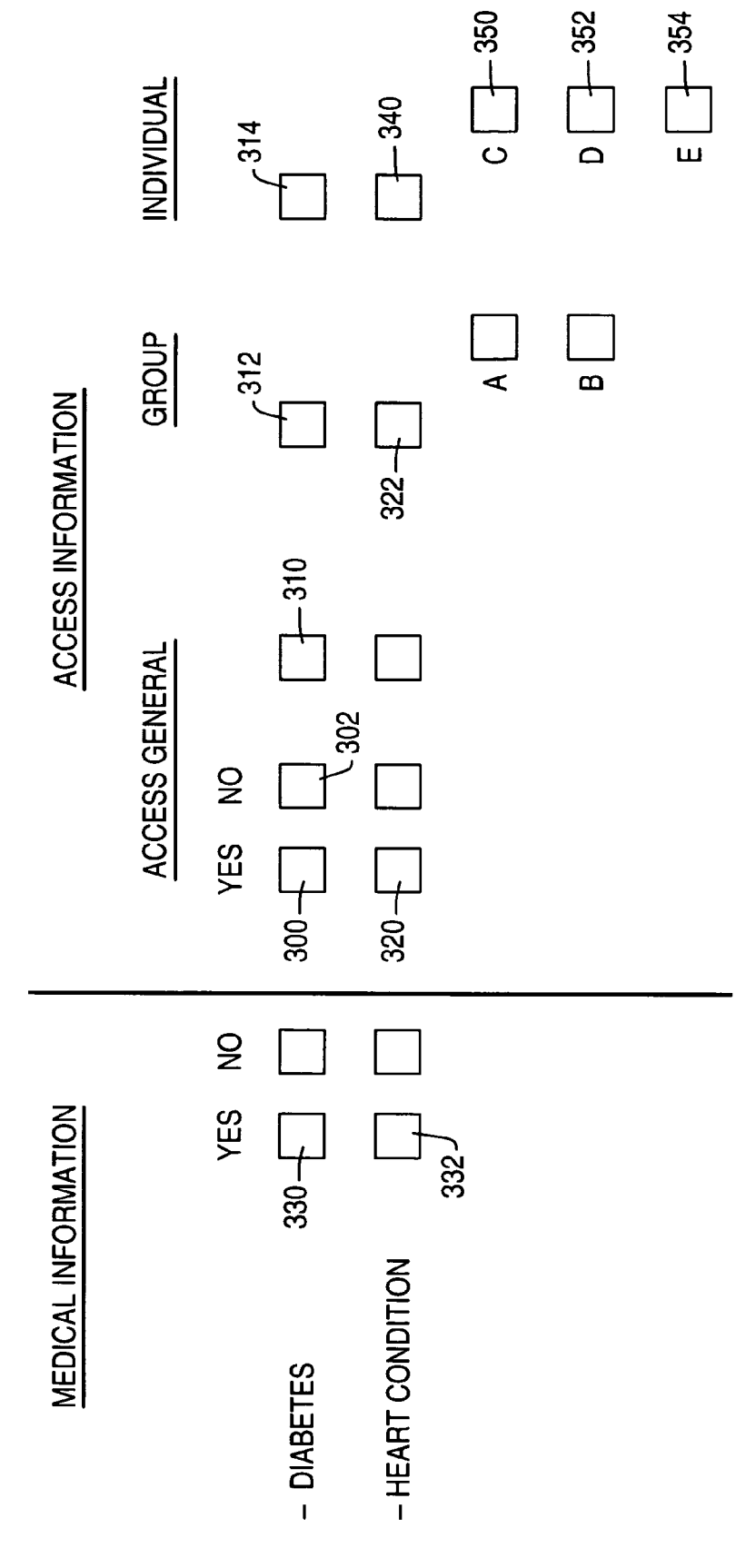
FIG. 3 is an exemplary screen depicting a graphical user interface illustrating how a consumer selects consumer information and selects third parties to provide consumer information to in accordance with the present invention.

When a consumer interfaces their personal storage device 200 (e.g., smart card) with the kiosk 210, the software tool 214 on the kiosk asks the consumer what types of information they would like to share with merchant or business. For example, referring now to FIG. 3, a screen generated by the software tool 214 could be displayed. As illustrated in FIG. 3, there is one particular category called medical information. The medical information is further sub-divided into sub-categories including diabetes and heart condition. If the consumer has diabetes or a heart condition then they would check the respective "yes" box 330, 332 and additional information would be requested from the consumer for storage in the relational database (see FIG. 4).

The medical information (diabetes or heart condition) could be accessed by the data warehouses 250-1 . . . 250-N depending on the level of access rights provided by the consumer. As depicted in FIG. 3, the consumer can either check the "yes" or "no" box 300, 302 either granting or denying access to medical information. If the combination "yes" box 300 is checked, then access rights can be provided for all the medical information on the personal storage device either generally, group or individually. General access rights would be granted by the consumer for medical information if box 310 is checked including phone numbers to call in emergency situations. General access rights allow any third party to access all the medical information in the category called medical information. Alternatively, the access rights can be provided in a more specific manner. For example, with respect to diabetes, the access could be granted generally using box 320. This means that with respect to medical information, the diabetes information can be accessed by any third party. However, if only this box was checked then the third party would not be able to access other medical information such as heart condition information. Access may be granted on a group basis using group access box 322. The consumer can then further select certain groups such as Group. A or Group B. Alternatively or in combination, the consumer could provide individual access using box 340 and provide access to individual information gatherers using boxes 350, 352 and 354.

The consumer then chooses among various levels/categories (medical information/diabetes, heart condition are depicted in FIG. 3) such as medical, financial, frequent flyer/buyer, hobbies/interests, demographic (i.e., age, sex, salary band, etc.). If a consumer wanted to control the detail provided to the third party, they could view and permit access to specific items under each category. For example, a consumer could allow a business/merchant/institute/agency/ etc. to access their age and sex, but not their salary band. Optionally, a consumer could choose "all" in order to make all the information that the party wanted available to them. For example, the "all" instance may be useful when applying for a home mortgage.

The detailed information for diabetes and heart condition would be contained in a diabetes table and a heart condition table 400, 410, respectively.

The information to which the consumer granted access would then be collected by the business's/merchant's/institute's/agency's system and processed by their data warehouse 250-1 . . . 250-N. Based upon this additional data, the merchant could then better target serving the needs of their customers, treating each customer as a market of one. This would serve to greatly increase the value of the data warehouse to that merchant or business, while still allowing each individual consumer to maintain the degree control over privacy that he or she desires.

FIG. 5 is an example of a user interface. FIG. 5 expands upon the FIG. 3 discussion. In FIG. 5, for example, with respect to medical information 500, there are sub-sets called chronic conditions 502, health insurance provider/plan 504, allergies 506, blood type 508 and immunization records 510. If the user wants to share their personal information with this merchant or business, the user clicks once in the box adjoining the category (502-510) to place a check in the box. If the user does not want to share their personal information, the user clicks again on the box (502-510) adjoining the category to place an "X" in the box. As depicted in FIG. 5, boxes 504, 506, 508 and 510 have check marks and therefore the user clicks again in the box adjoining the category to place an "X" in the box. For example, box 502 is marked with an "X". Other category names in FIG. 5 include financial information 520, travel information 530, dining information 540, merchant loyalty programs 550, demographic information 560 and hobbies/interests 570. Sub-categories of financial information include checking account number 522, savings account number 524 and salary 526. Sub-categories of travel information include airline seat preference 532, smoking preference 534, frequent flyer numbers 536, hotel frequent lodging numbers 538 and car rental express rental numbers 539. Sub-categories of dining information include food allergies 542 and smoking preferences 544. Sub-categories of merchant loyalty programs including merchant #1 (possibly a retailer) 552, merchant #2 (possibly a gas station) 554 and merchant #3 (possibly a restaurant) 556. Sub-categories of demographic information include age 562, sex 564, household income 566, zip code 568 and children in the household 569. Sub-categories of hobbies/interests include tennis 572 and baseball 574.

Clicking on the category name 500, 520, 530, 540, 550, 560, 570 will allow the user to expand the category allowing the user to specify that only one selected information should be shared from within that category. If the user shares only some information, the category check box will be blank (see boxes 500 and 560) indicating that the user has selected more detail to control the information shared within that category.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of storing consumer information in a personal storage device, comprising the steps of:
    coupling the personal storage device to a computer;
    storing at least one category of consumer information in a consumer database in the personal storage device with each category having at least one entry by a computer;
    displaying the category, the entry, and choices for access rights by the computer;
    recording consumer selection of group access rights for the entry to limit access to the entry to a plurality of information gatherers less than all of the information gatherers by the computer; and
    storing the group access rights in the consumer database by the computer.

2. The method of claim 1, further comprising the steps of:
    recording consumer selection of individual access rights for another of the entries to limit access to the other entry to a single one of the information gatherers by the computer; and
    storing the individual access rights in the consumer database by the computer.

3. The method of claim 1, wherein the category comprises medical information.

4. The method of claim 1, wherein the category comprises salary information.

5. The method of claim 1, wherein the category comprises payment card account numbers.

6. The method of claim 1, wherein the category comprises insurance information.

7. The method of claim 1, wherein the category comprises social security information.

8. The method of claim 1, wherein the category comprises bank account numbers.

9. The method of claim 1, wherein the category comprises frequent flyer numbers.

10. The method of claim 1, wherein the category comprises food preferences.

11. The method of claim 1, wherein the category comprises bank account numbers.

12. The method of claim 1, wherein the personal storage device comprises a smart card.

13. The method of claim 1, wherein the information gatherer comprises a merchant data warehouse.

14. The method of claim 1, wherein the computer comprises a kiosk.

15. The method of claim 1, wherein the computer comprises an automated teller machine.

16. The method of claim 1, wherein the personal storage device comprises a smart card.

17. A method of storing consumer information in a personal storage device, comprising the steps of:
    coupling the personal storage device to a computer;
    storing at least one category of consumer information in a consumer database in the personal storage device with each category having at least one entry by a computer;
    displaying the category, the entry, and choices for general, group, and individual access rights by the computer;
    recording consumer selection of general access rights for a first entry allowing all information gatherers to access the entry without restriction by the computer;
    recording consumer selection of group access rights for a second entry to limit access to the second entry to a portion of the information gatherers less than all of the information gatherers by the computer;
    recording consumer selection of individual access rights for a third entry to a single one of the information gatherers by the computer; and
    storing the general, group, and individual access rights of the information gatherers in the consumer database by the computer.

* * * * *

UNITED STATES PATENT AND TRADEMARK OFFICE
CERTIFICATE OF CORRECTION

| | | |
|---|---|---|
| PATENT NO. | : 7,293,174 B1 | Page 1 of 1 |
| APPLICATION NO. | : 09/567097 | |
| DATED | : November 6, 2007 | |
| INVENTOR(S) | : Don Charles Finfrock et al. | |

It is certified that error appears in the above-identified patent and that said Letters Patent is hereby corrected as shown below:

Column 10, Line 12 Claim 11, delete "Claim 11".

Column 10, Line 22 Claim 16, delete "Claim 16".

Signed and Sealed this

Twenty-fourth Day of August, 2010

David J. Kappos
*Director of the United States Patent and Trademark Office*